United States Patent [19]
Lai et al.

[11] Patent Number: 4,651,062
[45] Date of Patent: Mar. 17, 1987

[54] BEAM CURRENT COMPENSATION FOR VERTICAL SIZE IN A DIGITAL TV

[75] Inventors: Stephen H. Lai, Arlington Heights; Gopal K. Srivastava, Buffalo Grove, both of Ill.

[73] Assignee: Zenith Electronics Corporation, Glenview, Ill.

[21] Appl. No.: 808,207

[22] Filed: Dec. 12, 1985

[51] Int. Cl.$^4$ ............................................. H01J 29/56
[52] U.S. Cl. .................................................. 315/371
[58] Field of Search ............... 315/399, 408, 403, 370; 313/371

[56] References Cited
U.S. PATENT DOCUMENTS
4,031,430 6/1977 Enomoto .............................. 315/403

Primary Examiner—Theodore M. Blum

[57] ABSTRACT

A PWM signal of substantially constant amplitude is supplied to a B+ compensation circuit, for developing a vertical ramp voltage in a digital TV. One transistor of a current switching differentially coupled pair is supplied with the PWM signal and the other is properly biased so as to amplify the PWM signal without inverting its phase. The negative peaks of the PWM signal are clamped to voltage which varies with B+ and the positive peak of the PWM signal are a fraction of B+. However, the positive peaks vary more with B+ than do the negative peaks. The amplitude of the PWM signal, which is used for developing the vertical ramp, is the difference of the positive peak and the negative peak and therefore it will vary with B+. The B+ in the television receiver varies with beam current and by properly varying the vertical ramp in accordance with the variation in B+, the vertical size of the raster can be maintained.

4 Claims, 3 Drawing Figures

BEAM CURRENT COMPENSATION FOR VERTICAL SIZE IN A DIGITAL TV

CROSS REFERENCE TO RELATED APPLICATION

This application is related to application Ser. No. 808,206, filed 12/12/85, in the names of T. Kiteley and S. Vasavanonda, entitled VERTICAL COMPENSATION CIRCUIT UTILIZING VARIABLE GAIN AMPLIFIER, and assigned to Zenith Electronics Corporation.

BACKGROUND OF THE INVENTION AND PRIOR ART

This invention relates generally to deflection compensation systems for use in digital television (TV) receivers.

In a cathode ray tube (CRT) raster scan system the electron beam is horizontally and vertically deflected across the phosphor target on the face of the CRT by the magnetic field produced by a set of deflection windings situated on the CRT neck. In conventional reaction-scan systems the high voltage required for operation of the CRT is derived from the horizontal deflection system and is very sensitive to both changes in beam current and changes in B+ operating potential. Also, the size of the raster varies as a function of the high voltage applied. Should the high voltage decrease, for example, the electron beam is more readily deflected and the raster size increases. Thus, for a given scan or deflection voltage the raster size varies inversely with the high voltage applied. In most systems the scan voltage is closely related to the B+ operating potential, which tends to make such deflection systems self-compensating. Thus, an increase in beam current will give rise to a corresponding decrease in high voltage, which would normally cause an increase in the raster size, except for the fact that the scan voltage will decrease correspondingly because of the drop in B+ operating potential. Thus the sum of the effects tends to keep the raster size relatively constant and raster size changes with beam current or B+ changes is not a major problem in conventional television receivers.

With the advent of so-called digital television receivers, where analog functions are replaced by digital circuitry, the ramp-shaped vertical scan current is developed from a pulse width modulated (PWM) signal that consists of a series of fixed amplitude pulses of differing durations. Integration of the PWM signal results in an analog ramp current for producing the vertical deflection of the CRT beam. This PWM signal is, for all practical purposes, insensitive to changes in B+ operating potential. Consequently, in these receivers, variations in B+ can produce annoying changes in the height of the raster unless some type of compensation is employed.

OBJECTS OF THE INVENTION

The principal object of this invention is to provide an improved digital television receiver.

Another object of this invention is to provide a digital television receiver with improved raster display characteristics.

In accordance with the invention, the digital vertical PWM signal is clamped between a reference voltage level and a peak voltage level and the difference between the voltage levels is used to drive a vertical amplifier and ramp generator. The difference between the voltage levels is varied in response to changes in B+ operating potential to compensate the vertical scan for any changes therein.

BRIEF DESCRIPTION OF THE DRAWINGS

Other objects and advantages of the invention will become apparent on reading the following description in conjunction with the drawings in which.

DESCRIPTION OF THE PREFERRED EMBODIMENT

Figure 1:
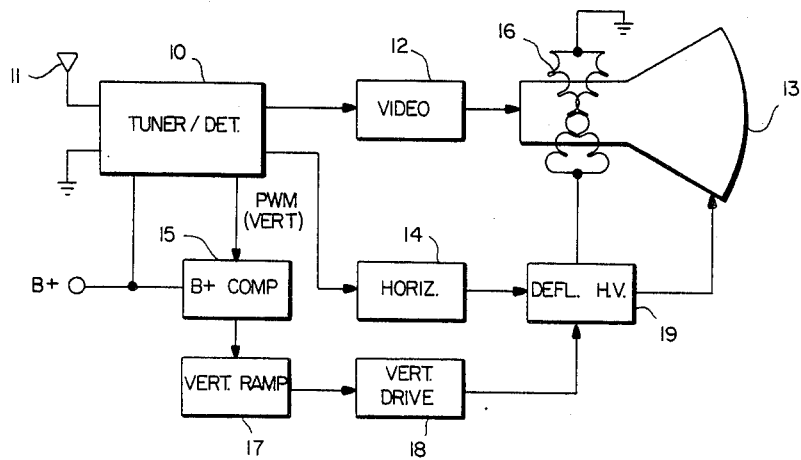
FIG. 1 is a partial block diagram of a television receiver constructed in accordance with the invention.

In FIG. 1, a TV receiver includes a tuner/detector 10 for receiving and detecting television signals. An antenna 11 couples signals thereto and a video output terminal supplies signals to a video amplifier 12 which, in turn, controls the electron beam developed in a CRT 13. Another output of tuner/detector 10 supplies suitable signals to a horizontal deflection circuit 14. A B+ operating potential is supplied to tuner/detector 10 and to a B+ compensation circuit 15. Tuner/detector 10 supplies a PWM vertical signal to compensation circuit 15 and the output thereof is supplied to a vertical ramp circuit 17, which in turn, supplies a vertical drive circuit 18. Horizontal circuit 14 and vertical drive circuit 18, together supply deflection/high voltage circuit 19, which has one output providing high voltage to CRT 13 and another for supplying drive currents to deflection windings 16 situated on the neck of CRT 13. With the exception of the B+ compensation circuit, the described block diagram is in all aspects conventional.

Figure 2:
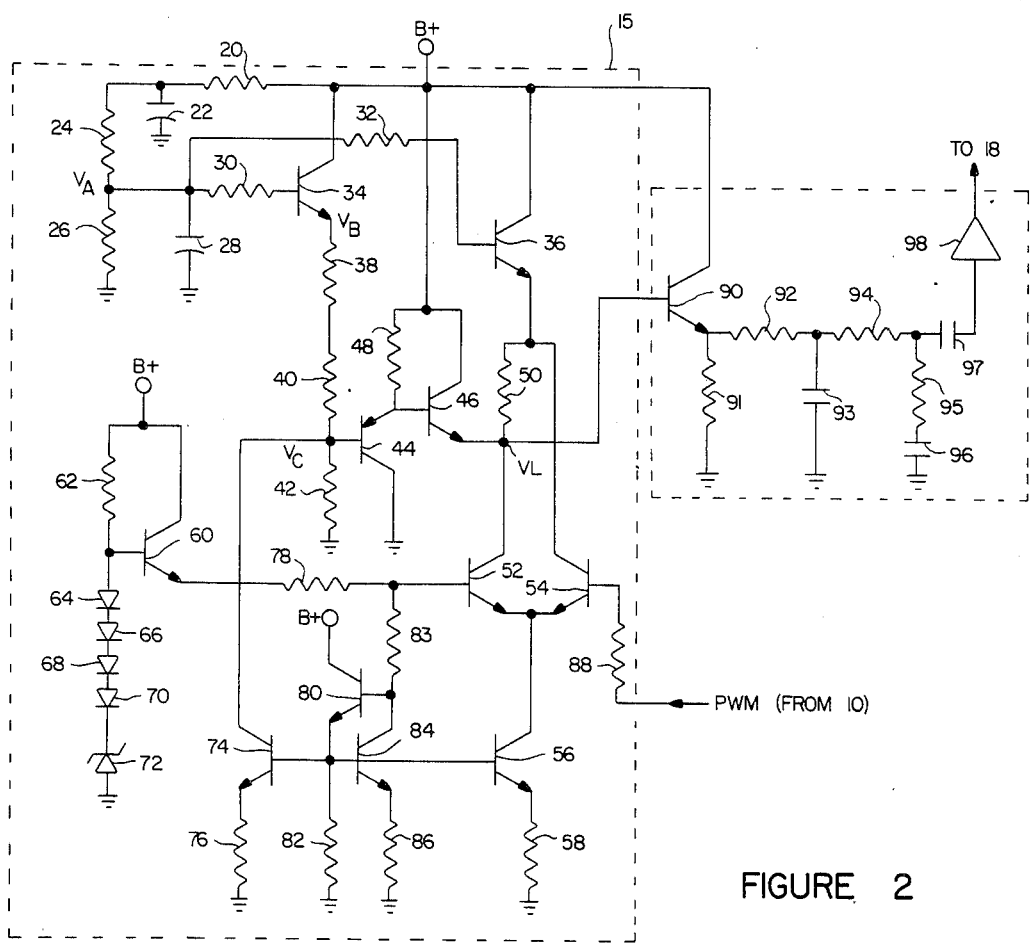
FIG. 2 is a schematic diagram of the compensation system of the invention.

In FIG. 2, references to B+ will be understood to mean the B+ terminal illustrated for tuner/detector 10 in FIG. 1. The B+ terminal is connected to a filter circuit comprising a resistor 20 and a capacitor 22. The output of the filter circuit supplies a voltage divider comprising a series-connected pair of resistors 24 and 26. The junction of the voltage divider is connected to another filter capacitor 28 and to the junction of a pair of bias resistors 30 and 32 that are connected to the base electrodes of a pair of transistors 34 and 36, respectively. The collector electrodes of the transistors are connected to B+ and the emitter electrode of transistor 34 is connected to a series-connected group of resistors 38, 40 and 42. The junction of resistors 40 and 42 is connected to the base electrode of a clamp transistor 44 having its emitter electrode connected back to B+ through a resistor 48. The emitter electrode of transistor 44 is also connected to the base electrode of an emitter follower transistor 46 having its collector electrode connected to B+ and its emitter electrode connected to a voltage clamp point labelled VL.

The emitter electrode of transistor 36 is labelled VH which represents a voltage peak or high point and supplies a differentially connected pair of current switching transistors 52 and 54. Transistor 54 has its collector electrode connected directly to the emitter of transistor 36 (junction VH) whereas transistor 52 has its collector electrode connected to point VL which, in turn, is connected through a resistor 50 to point VH. The emitter electrodes of transistors 52 and 54 are connected together and to the collector electrode of a transistor 56 having its emitter electrode connected to ground through a resistor 58.

A compensating transistor 60 has its collector electrode connected to B+ and its base electrode connected to the junction of a resistor 62 and a series connection of four diodes 64, 66, 68 and 70 and a zener diode 72. The other terminal of zener diode 72 is connected to ground. The emitter electrode of transistor 60 is connected through a resistor 78 to the base of transistor 52 and, through a resistor 83, to the collector electrode of a transistor 84, the emitter electrode of which is connected to ground through a resistor 86. Transistor 84 is part of a current mirror along with a transistor 74 the collector electrode of which is connected to the junction of resistors 42 and 40 and the emitter electrode of which is connected to ground through a resistor 76. The current mirror is supplied with bias current by a transistor 80 having its collector electrode connected to B+, its base electrode connected to the collector of transistor 84 and its emitter electrode connected to the bases of transistors 74 and 84 and to ground through a resistor 82. The base of transistor 56 is connected to the bases of the current mirror transistors 74 and 84. The input to the base of transistor 54 is the PWM signal from tuner/detector 10, supplied through a resistor 88.

The vertical ramp developing circuit 17 is indicated by the dashed line block and includes a transistor 90 having its base electrode connected to point VL, its collector electrode connected to B+ and its emitter electrode connected to ground through a resistor 91. Integration of the PWM signal is accomplished by a filter arrangement comprising resistors 92, 94 and 95 and capacitors 93, 96 and 97. The result of the application of the PWM signal to the filter is a ramp-shaped voltage, which is suppled to a vertical amplifier 98 of fixed gain, the output of which is supplied to vertical drive circuit 18.

In operation, the voltage divider comprising resistor 24 and 26 selects a portion of the B+ potential and supplies it, after suitable filtering, to the bases of transistors 34 and 36, which operate in parallel. The time constant of the filter circuit, consisting of resistor 20 and capacitor 22, is sufficiently large so that fast variations in B+ do not trigger operation of the compensation circuit. The fraction of the B+ potential selected is about 0.7, although it will be appreciated that this is dependent in part upon the particular circuitry involved. Transistors 44 and 46 provide clamping for establishing point VL at a reference potential. Transistor 36 functions as a constant voltage source for supplying differentially coupled transistors 52 and 54 which function as current switching transistors. The compensating transistor 60 has its base connected to a voltage source that is regulated by zener diode 72 which is connected in series with diodes 64, 66, 68 and 70. These diodes compensate for temperature variations in the characteristics of the transistors 60, 80 and of the zener diode 72. The current flow through resistors 78 and 83 and transistor 84 is mirrored in the collector circuit of transistor 74 and produces slight changes at the base of clamp transistor 44 for making slight changes in the clamp voltage at point VL. The amplitude of change in VL is Vx, and by selecting the value of resistor 76, Vx is selected to satisfy equation 5 below. It will be appreciated that the collector current of transistor 56 is selected such that the PWM signal never comes out of the clamp, that is, its most negative peaks are always at level VL.

The following equations have been derived to explain how the amplitude of the PWM signal is varied in direct response to the changes in the power supply B+. Let VA be the dc signal at the junction of resistors 24 and 26. Vc is the dc signal at the base of transistor 44. Vx is the dc voltage drop due to collector current of transistor 74 across equivalent impedance $$\frac{R42 \times (R40 + R38)}{R38 + R40 + R42}.$$

$$Va = \frac{B^+ \times R26}{R24 + R26} = K1 \times B^+$$

Therefore $$VH = K1 \times B^+ - V36 \tag{1}$$

Where V36 is the base emitter voltage of transistor 36.

$$Vb = K1 \times B^+ - V34$$

Where V34 is the base emitter voltage of transistor 34.

$$Vc = \frac{Vb \times R42}{R38 + R40 + R42} - Vx = \frac{(K1 \times B^+ - V34)}{R38 + R40 + R42} - Vx$$

$$= K1 \times B^+ \times \frac{R42}{R38 + R40 + R42} -$$

$$\frac{R42 \times V34}{R38 + R40 + R42} - ]Vx$$

$$Vc = K1 \times K2 \times B^+ - K2 \times V34 - Vx \tag{2}$$

Since $$VL = Vc + V44 - V46$$

Where V44 and V46 are base emitter voltages of transistors 44 and 46 respectively.
Therefore $$VL = Vc$$

Since V44 is about equal to V46.

$$VL = K1 \times K2 \times B^+ - K2 \times V34 - Vx \tag{3}$$

The pulse width modulated signal which is applied to the base of 54 will cause transistor 52 to switch ON and OFF at the same rate and at the same pulse width as it appears at the base of transistor 54. When transistor 52 conducts its collector voltage will drop but can not drop below voltage VL due to the clamp applied by transistors 44 and 46. Therefore the ON state of transistor 52 is its collector voltage VL and at its OFF state is its collector voltage VH, since there is no drop across R50 when transistor 52 is OFF. The signal at the base of transistor 90 is a pulse width modulated signal of the same polarity, same rate and width as at the base of transistor 54, except that its amplitude, Vpwm is VH−VL.

$$Vpwm = VH - VL$$

$$= K1 \times B^+ - V36 - K1 \times K2 \times B^+ + K2 \times V34 + Vx$$

-continued $$= (K1 - K1 \times K2) B^+ - (V36 - K2 \times V34 - Vx),$$

if $V36 = V34 = \phi$ $$= (K1 - K1 \times K2) B^+ - (\phi - K2 \times \phi - Vx)$$

$$Vpwm = K3B + -0 \quad (4)$$

Where $K3 = K1 - K1 \times K2$

If $$Vx = (1 - K2)\phi$$

The collector current of transistor 74 is selected such that it satisfies equation (5).

From equation (4) we observe that the amplitude of the pulse width modulated signal will vary with B+ but the amount of variation will be determined by the constant factor K3. Therefore by proper selection of K3, which in turn is achieved by proper selection of R24, R26, R38, R40 and R42, we can have an amplitude change with B+ change such that it changes the amplitude of the vertical deflection ramp voltage thus compensating the vertical height with beam current change.

Figure 3:
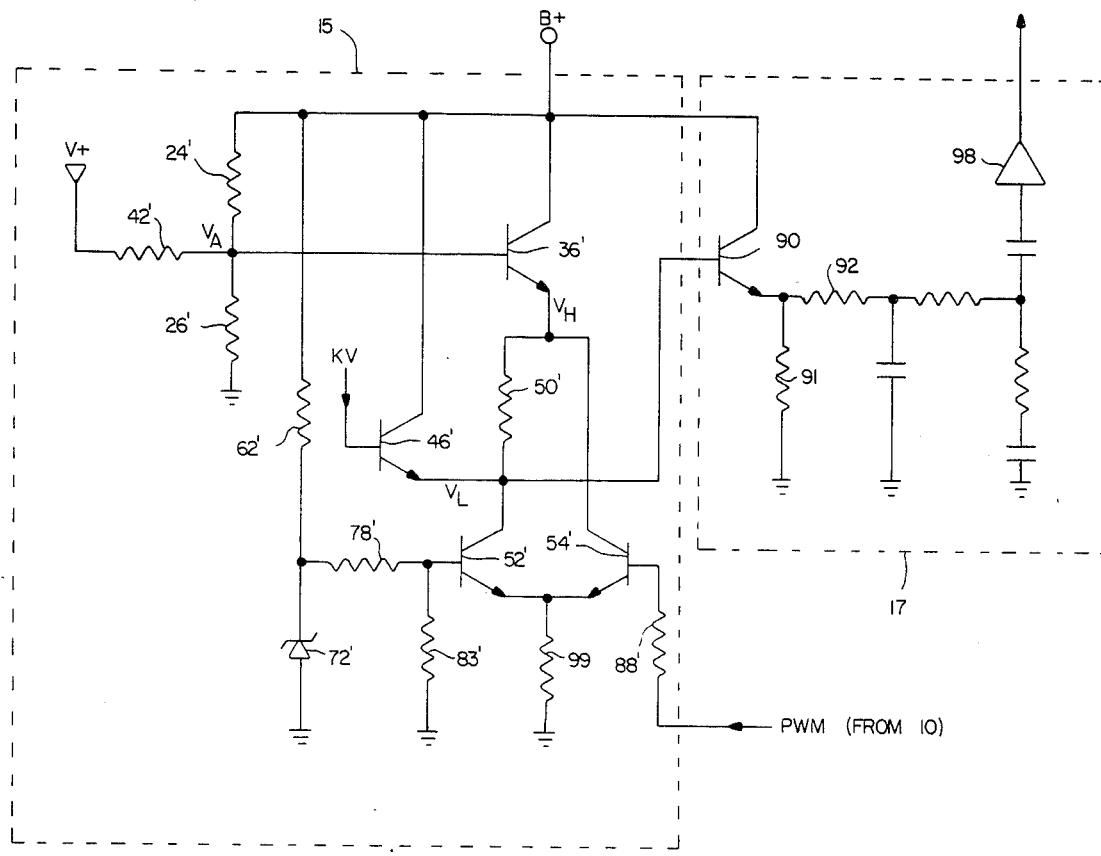
FIG. 3 represents a preferred implementation of the invention when used in a non-integrated circuit form.

FIG. 3 represents a preferred implementation of the invention when used in a non-integrated circuit form. In the circuit of FIG. 2, the current transistor 56 and its associated circuitry for temperature compensation is available for little additional cost, whereas if a discrete component implementation is desired, the circuit of FIG. 3 is preferable. The circuit functions in a similar manner to that of FIG. 2 and like components are indicated by prime reference numbers. The B+ voltage is impressed across a voltage divider comprising a series pair of resistors 24' and 26', the junction of which feeds the base of a transistor 36'. A potential from a source of voltage V+ is supplied to that junction through a resistor 42' and a portion thereof is supplied to the base of a transistor 46'. It should be noted that V+ is regulated and does not change with beam current.

Variations in B+ due to changes in beam current are thus reflected in changes in voltage at the base of transistor 36'. The differentially coupled pair of transistors 52' and 54' have a single resistor 99 acting as a current source in place of transistor 56 and its associated components. The PWM signal is supplied to the base of transistor 54' through a resistor 88'. The voltage regulator diode 72' is coupled through a resistor 62' to B+. A voltage divider, consisting of resistor 78' and 83', is used to apply a portion of the regulated voltage to the base of transistor 52'. The output is taken from the collector of transistor 52' and fed to the base of transistor 90, included in dashed line block 17 along with similar components described in FIG. 2. Since the base-emitter voltage of transistors 36' and 46' are approximately equal, their contribution to the amplitude of the PWM signal, Vpwm, is negligible. Therefore no temperature compensation of Vpwm is needed.

What has been described is a novel compensation circuit for correcting the vertical ramp generated in a digital TV to compensate for changes in B+ potential. It is recognized that numerous modifications and changes in the described embodiment of the invention will be apparent to those skilled in the art without departing from the true spirit and scope thereof. The invention is to be limited only as defined in the claims.

What is claimed is:

1. A television receiver including a source of B+ voltage subject to change, a CRT and means for producing a raster on said CRT;

vertical deflection means producing the vertical portion of said raster in response to a PWM signal developed by said television receiver and having an amplitude that is substantially independent of variations in said B+ voltage;

means for compensating for the changes in vertical size of said raster with changes in said B+ voltage comprising:

means establishing a reference clamp voltage and a second voltage;

means for changing the amplitude of said PWM signal as a function of said reference clamp voltage and said second voltage; and means for changing said reference clamp voltage as a function of changes in said B+ voltage.

2. The television receiver of claim 1 wherein said means for changing includes temperature compensating means.

3. The television receiver of claim 2 wherein said compensating means further include:

a differentially coupled pair of transistors functioning as a current switch;

means for supplying said PWM signal to one of said differentially coupled pair of transistors;

a compensating transistor for supplying a signal to the other of said pair of differentially coupled transistors; and a resistor coupled to the load circuit of one of said differentially coupled transistors for developing said ramp voltage thereacross.

4. The television receiver of claim 3 wherein said compensating means further include:

a clamp transistor coupled to one terminal of said resistor;

a voltage source coupled to the other terminal of said resistor and supplying said other one of said differentially coupled transistors;

a first current mirror transistor coupled to said base of said differentially coupled transistor; and a second current mirror transistor coupled to change the voltage on said clamp transistor.

* * * * *